United States Patent
Cantu et al.

(10) Patent No.: US 8,700,873 B2
(45) Date of Patent: Apr. 15, 2014

(54) DIRECT MEMORY ACCESS MEMORY MANAGEMENT

(75) Inventors: Edgar O. Cantu, Round Rock, TX (US); David R. Marquardt, Round Rock, TX (US); Jose G. Rivera, Austin, TX (US); Thinh H. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 12/904,468

(22) Filed: Oct. 14, 2010

(65) Prior Publication Data

US 2012/0093170 A1    Apr. 19, 2012

(51) Int. Cl.
*G06F 12/00* (2006.01)
*G06F 13/00* (2006.01)
*G06F 13/28* (2006.01)

(52) U.S. Cl.
USPC ............. 711/165; 711/171; 711/173; 710/22; 709/212; 709/223

(58) Field of Classification Search
USPC .................. 711/165, 171, 173; 709/212, 223; 710/22
See application file for complete search history.

(56) References Cited

U.S. PATENT DOCUMENTS

| | | | |
|---|---|---|---|
| 5,878,217 A | 3/1999 | Cherukuri | |
| 6,430,628 B1 | 8/2002 | Connor | |
| 6,584,101 B2 | 6/2003 | Hagglund et al. | |
| 6,792,481 B2 | 9/2004 | Hoang et al. | |
| 6,804,673 B2 | 10/2004 | Sugahara et al. | |
| 7,072,996 B2 | 7/2006 | Adusumilli et al. | |
| 8,214,448 B2 | 7/2012 | Cantu et al. | |
| 2003/0225991 A1* | 12/2003 | Calderon et al. | 711/173 |
| 2006/0168283 A1* | 7/2006 | Georgiou et al. | 709/230 |

OTHER PUBLICATIONS

U.S. Appl. No. 12/763,469, filed Apr. 20, 2010, Cantu et al.

* cited by examiner

*Primary Examiner* — Stephen Elmore
*Assistant Examiner* — Mark Giardino, Jr.
(74) *Attorney, Agent, or Firm* — Yee & Associates, P.C.; David Mims (57) ABSTRACT

A method, computer program product, and apparatus for managing data packets are presented. A data packet in the data packets is stored in a first portion of a memory in response to receiving the data packet at a device. The first portion of the memory is allocated to the device. A determination is made whether a size of the data packet is less than a threshold size. The data packet is copied from the first portion of the memory allocated to the device to a second portion of the memory in response to a determination that the size of the data packet stored in the memory is less than the threshold size.

20 Claims, 7 Drawing Sheets

DIRECT MEMORY ACCESS MEMORY MANAGEMENT

BACKGROUND

1. Field

The present disclosure relates to managing data and in particular to managing data packets received at a network adapter. Still more particularly, the present disclosure relates to a method and apparatus for managing data packets received in a direct memory access memory for a network adapter.

2. Description of the Related Art

In a network, computers send and receive data in the form of data packets. The data packets are commonly received using a network adapter. A network adapter is a hardware device that allows computers to communicate over a network. In a network adapter, data packets received are stored in buffers. A buffer is a portion of memory used to temporarily hold data while the data is being moved from one place to another.

Generally speaking, a processor unit in a computer stores data in a memory. The data may be stored in buffers in the memory. However, using the processor unit to store data packets received in a buffer may increase a number of operations performed by the processor unit. The total number of operations performed by a processor unit is generally referred to as processor overhead. This increase in the processor overhead may decrease the performance of the processor unit. For example, the processor unit may not be able to process as many instructions while storing data packets received.

To reduce the overhead of the processor unit, devices that receive data packets may have portions of memory allocated to the device. A device that has memory allocated to the device can store data in that memory independently of the processor unit. This memory allocation to the device reduces the overhead or number of operations to be performed by the processor unit. For example, a network adapter can store data packets received in a buffer without the data packet being written to the buffer by the processor unit. The allocation of memory to a device is generally referred to as direct memory access (DMA). In other words, the device has "direct" or independent-of-the-processor memory access.

However, the amount of memory allocated to the device may be limited. For example, certain devices may have memory within the devices. In other examples, a portion of a memory may be shared among multiple devices. In either situation, the amount of memory that may be allocated to one device has limits.

For example, in a network, a network adapter may receive multiple data packets for a certain period of time. The network adapter may receive data packets faster than the data packets are processed. In this situation, demand for storage at the network adapter may exceed a capacity of the memory allocated to the network adapter. When the capacity is exceeded, data packets may be dropped by the network adapter or not stored in the memory. When data packets are dropped, the network adapter that dropped the data packets may have to request retransmission of the data packet. Retransmission of the data packets increases an amount of traffic in a network and may decrease the speed of connections in the network.

Accordingly, it would be advantageous to have a method and apparatus which takes into account one or more of the issues discussed above as well as possibly other issues.

SUMMARY

The different illustrative embodiments provide a method, computer program product, and apparatus for managing data packets. In an illustrative embodiment, a data packet in the data packets is stored in a first portion of a memory in response to receiving the data packet at a device. The first portion of the memory is allocated to the device. A determination is made whether a size of the data packet is less than a threshold size. The data packet is copied from the first portion of the memory allocated to the device to a second portion of the memory in response to a determination that the size of the data packet stored in the memory is less than the threshold size.

BRIEF DESCRIPTION OF THE SEVERAL VIEWS OF THE DRAWINGS

FIG. 6 is a flowchart of a process for managing data packets depicted in accordance with an illustrative embodiment.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
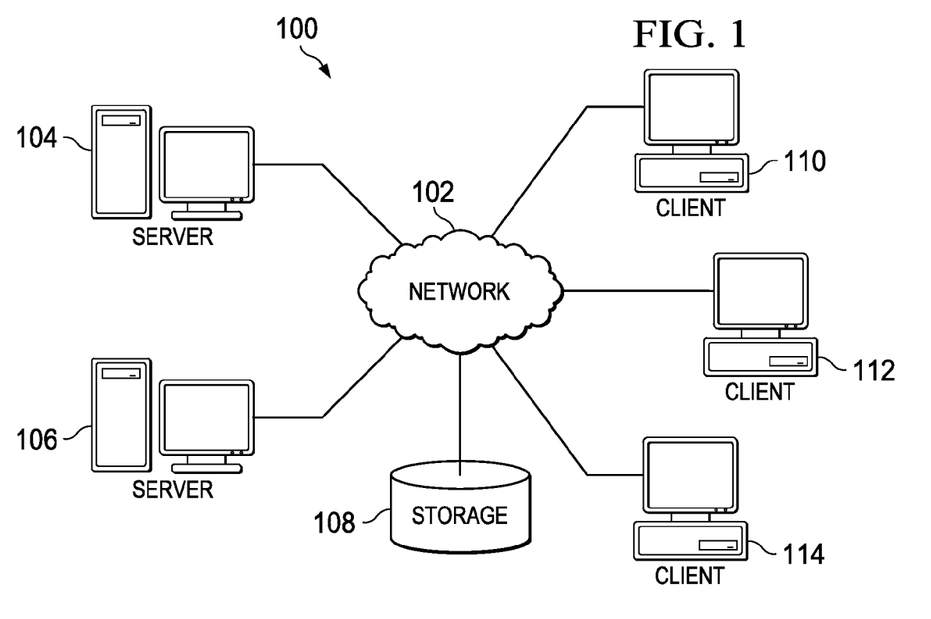
FIG. 1 is an illustration of a data processing environment depicted in accordance with an illustrative embodiment.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages.

In these illustrative examples, data may be exchanged between any one of server computer 104 and client computers 110, 112, and 114 in the form of data packets. The data packets may be sent and received using network 102. The quantity and speed with which data packets are sent and received may vary. For example, the types of connections in network 102 and hardware within server computer 104 and client computers 110, 112, and 114 may increase or decrease the speed that data packets are sent and received in network 102. Additionally, the amount of traffic in network 102 may increase the quantity of data packets that are sent and received. In one example, data packets received by computer 110 may be managed based on the quantity of data packets received to increase the speed that data packets are sent and received in network 102.

Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
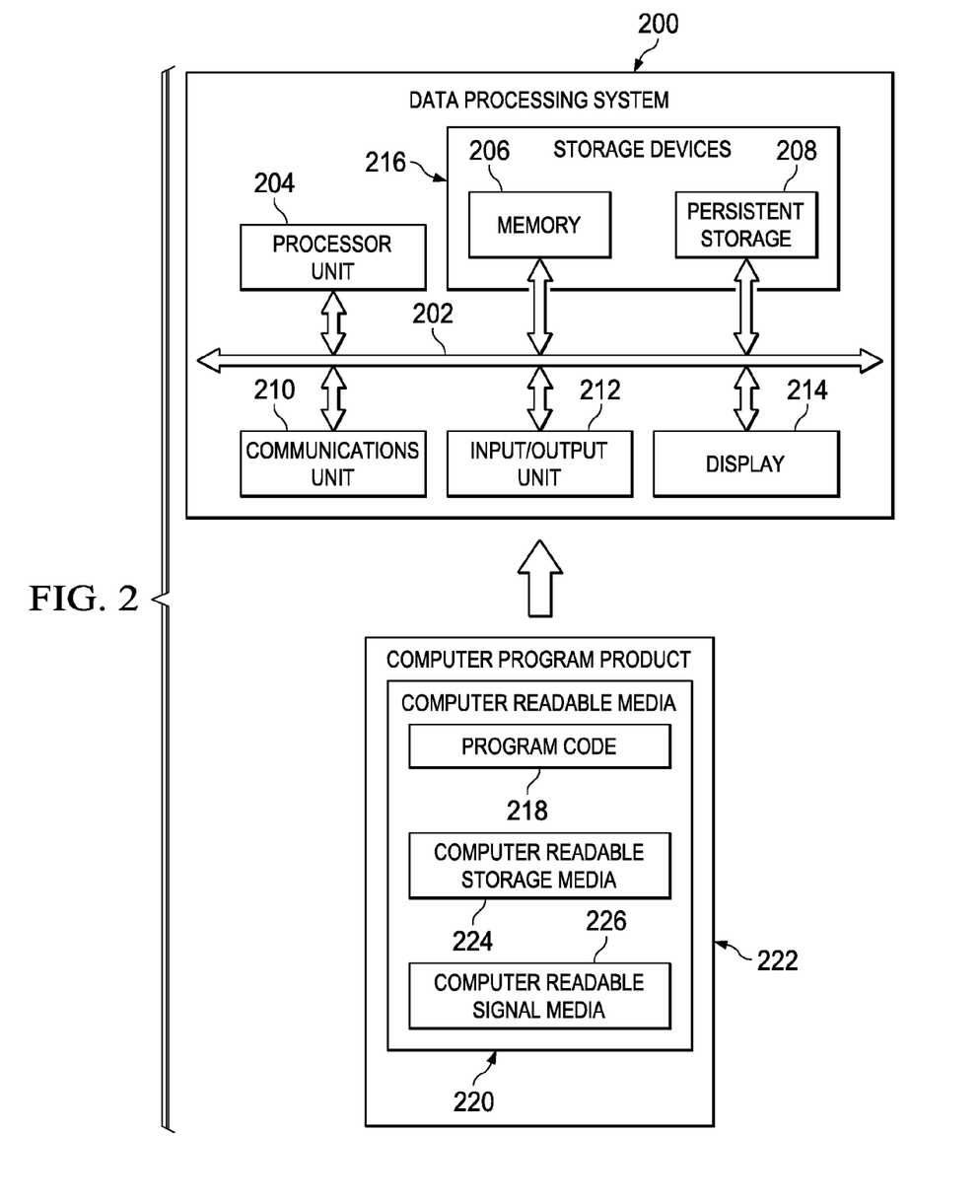
FIG. 2 is an illustration of a block diagram of a data processing system depicted in accordance with an illustrative embodiment.

Turning now to FIG. 2, a block diagram of a data processing system is depicted in accordance with an illustrative embodiment. Data processing system 200 is an example of a data processing system that may be used to implement servers and clients, such as server 104 and client 110 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

The different illustrative embodiments recognize and take into account a number of different considerations. For example, the different illustrative embodiments recognize that memory allocated to a device may be limited. Data packets received by the device may exceed a capacity of the memory allocated to the device. More specifically, data packets may be received faster than the data packets can be processed. Depending on the capacity of the memory and the rate at which data packets are received, at a certain point, storage space for the data packet will be unavailable. Data packets may then be dropped. Dropped data packets may have to be retransmitted. Retransmission of data packets can increase congestion in a network and decrease a speed of communication in the network.

The different illustrative embodiments recognize and take into account that one solution may involve storing data packets in memory not allocated to the device when the memory allocated to the device is near capacity. However, the different illustrative embodiments recognize that storing data packets in memory not allocated to the device may decrease performance. For example, data packets stored in memory not allocated to the device may need to be written to the memory using a processor unit. The processor unit writing data packets to the memory increases the overhead for the processor unit. An increased overhead may cause applications using the processor unit to run slower. Additionally, data packets stored in memory not allocated to the device may become lost or fragmented.

The different illustrative embodiments further recognize that data packets received by a device may vary in size. A buffer in the memory allocated to the device may be able to store one data packet. A smaller data packet may require a shorter period of time to be written to a memory by a processor unit than would a larger data packet.

Thus, the different illustrative embodiments provide a method, computer program product, and apparatus for managing data packets. In an illustrative embodiment, a data packet in the data packets is stored in a first portion of a memory in response to receiving the data packet at a device. The first portion of the memory is allocated to the device. A determination is made whether a size of the data packet is less than a threshold size. The data packet is copied from the first portion of the memory allocated to the device to a second portion of the memory in response to a determination that the size of the data packet stored in the memory is less than the threshold size.

Figure 3:
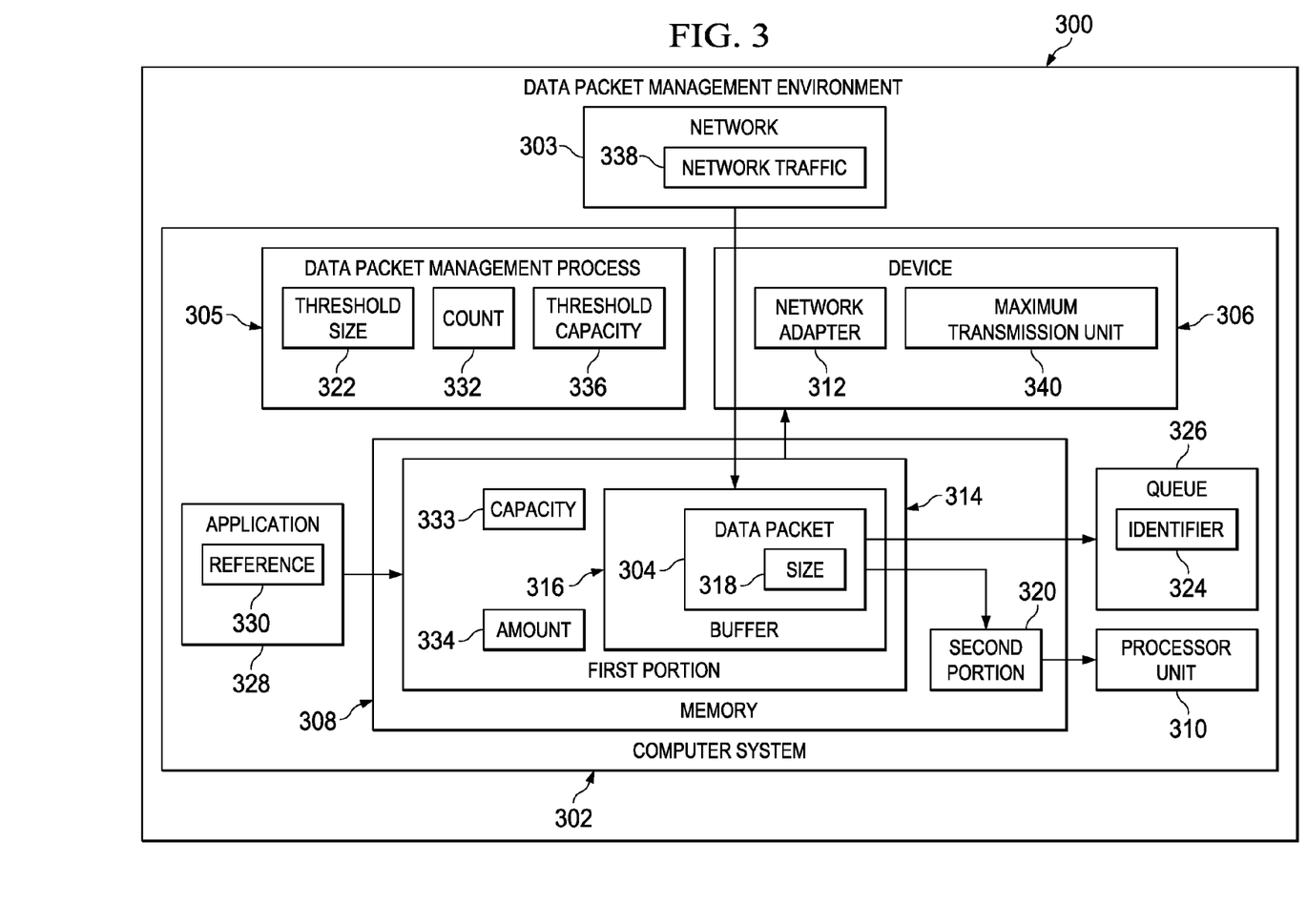
FIG. 3 is an illustration of a block diagram of a data packet management environment depicted in accordance with an illustrative embodiment.

With reference now to FIG. 3, an illustration of a block diagram of a data packet management environment is depicted in accordance with an illustrative embodiment. Data packet management environment 300 is an example of a data packet management environment in which illustrative embodiments may be implemented. In an illustrative embodiment, data packet management environment 300 is implemented in computer system 302. Computer system 302 is an example implementation of data processing system 200 in FIG. 2.

Data packet management environment 300 includes computer system 302. Computer system 302 receives data packets, such as data packet 304, from network 303. For example, computer system 302 may receive data packet 304 from other computer systems in network 303, such as server computer 104 and client computers 110, 112, and 114 in FIG. 1.

In these illustrative examples, computer system 302 includes data packet management process 305, device 306, memory 308, and processor unit 310. Data packet management process 305 manages data packet 304 received by computer system 302. Device 306 may be any device that receives data in computer system 302. For example, device 306 may be network adapter 312. In other examples, device 306 may be a disk drive controller, a graphics card, a network card, a network interface controller, a local area network adapter, a sound card, and/or any other device suitable for receiving data in a computing system.

In this example, device 306 receives data packet 304 from network 303. Device 306 stores data packet 304 in first portion 314 of memory 308. First portion 314 of memory 308 may be allocated to device 306.

As used herein, "allocated" when referring to memory or storage means that a device is free to access the memory or storage. As used herein, "access" includes writing data to a memory or storage device and reading data from a memory or storage device. The device may read data from the memory or storage device and write data to the memory or storage device independently of a processor unit, such as, for example, processor unit 310.

In these illustrative examples, first portion 314 of memory 308 may include a set of buffers, such as, for example, buffer 316. As used herein, a set, when referring to items, means one or more items. Device 306 may store data packet 304 in buffer 316. Buffer 316 may be a direct memory access buffer because first portion 314 of memory 308 is allocated to device 306.

Data packet 304 has size 318. Depending on size 318, data packet 304 may be copied to second portion 320 of memory 308. For example, data packet management process 305 may compare size 318 of data packet 304 with threshold size 322. If size 318 is smaller than threshold size 322, data packet management process 305 copies data packet 304 to second portion 320 of memory 308. Thus, buffers within first portion 314 of memory 308 are not wasted on data packets that are smaller than threshold size 322.

In these illustrative examples, second portion 320 of memory 308 is not allocated to device 306. Rather second portion 320 of memory 308 is associated with processor unit 310.

As used herein, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

For example, data written to second portion 320 of memory 308 requires involvement of processor unit 310. In other words, second portion 320 of memory 308 may be a set of non-direct memory access buffers. For example, device 306 may have to register second portion 320 of memory 308 with processor unit 310 to store data packet 304 in second portion 320. In another example, device 306 may send data packet to processor unit 310. Then processor unit 310 will write data packet 304 to second portion 320 of memory 308.

If data packet 304 is copied to second portion 320, then device 306 may be able to reuse buffer 316. For example, device 306 can overwrite data packet 304 previously stored in buffer 316 because data packet 304 was copied to second portion 320. Thus, device 306 may store new data packets received at device 306 in buffer 316. In another example, data packet management process 305 may delete data packet 304 from buffer 316 once data packet 304 is copied to second portion 320 of memory 308.

Once data packet 304 is stored, data packet management process 305 places identifier 324 of data packet 304 in queue 326. Data packet management process 305 places identifier 324 in queue 326 for processing of data packet 304. In these examples, identifier 324 represents data packet 304. Identifier 324 may contain metadata that identifies data packet 304. The metadata may include information found in a header of the data packet. For example without limitation, identifier 324 may include an internet protocol address of associated with the sender, an internet protocol address of associated with a recipient, a size of the data packet, the content of the data packet, a time the packet was requested, a time the packet was sent, a time the packet was received, and/or any other suitable information for identifying data packet 304.

In these illustrative examples, application 328 may have requested data packet 304. Once identifier 324 is placed in queue 326, application 328 may recognize that data packet 304 has been received. Application 328 may then use the data contained in data packet 304 while data packet 304 is stored in one of first portion 314 and second portion 320 of memory 308.

While application 328 is using the data contained in data packet 304, application 328 will hold reference 330 to data packet 304. Reference 330 notifies data packet management process 305 that data packet 304 is being used. Thus, data packet management process 305 will not overwrite the memory location where data packet 304 is stored. Reference 330 may be any form of indication that is recognizable in computer system 302 that a resource is being referenced or used by an application. For example, without limitation, reference 330 may be a reference count, a pointer, a handle, and/or any other suitable indicator that indicates that a resource is being referenced.

If application 328 no longer needs the data within data packet 304, application 328 may remove reference 330 from data packet 304. Additionally, application 328 may have data packet 304 copied to another location such as another portion of memory, a hard disk or other type of storage device. Once reference 330 has been removed from data packet 304, data packet management process 305 removes identifier 324 from queue 326. Also when data packet 304 is copied to the other location, data packet management process 305 removes identifier 324 from queue 326.

Once identifier 324 has been removed from queue 326 or data packet 304 has been copied to the other location, device 306 may store new data packets received in buffer 316. In another example, data packet management process 305 may delete data packet 304 from buffer 316 once identifier 324 is removed from queue 326 or data packet 304 has been copied to the other location.

In these illustrative examples, data packet management process 305 maintains count 332. Count 332 is a number used to keep track of data packets. For example, count 332 may be a number of data packets that are stored in second portion 320 of memory 308. Count 332 may also include metadata for identifying which data packets are stored in second portion 320 of memory 308. For example, without limitation, count 332 may be a number of references, pointers, or handles that refer to a resource.

Each time a data packet, such as data packet 304, is copied into second portion 320 of memory 308, data packet management process 305 increases count 332. Whenever an identifier, such as identifier 324, for a data packet stored in second portion 320 of memory 308 is removed from queue 326, data packet management process 305 decreases count 332. In this manner, data packet management process 305 tracks the number of data packets that are stored in second portion 320 of memory 308 using count 332.

This tracking may prevent fragmentation of data packets that are stored in second portion 320 of memory 308. For example, data packet management process 305 may allocate a buffer within second portion 320 of memory 308. The buffer within second portion 320 may be the size of a page of memory and configured to hold multiple data packets. Count 332 may keep track of the number of data packets in the buffer in second portion 320 of memory 308. As long as count 332 for the buffer is greater than zero, data management process 305 will not de-allocate the buffer. De-allocating the buffer while there are data packets within the buffer may cause fragmentation of data packets that are stored in second portion 320 of memory 308. Thus, data management process 305 maintains count 332 to know when to de-allocate the buffer in second portion 320 of memory 308.

In some embodiments, data packet management process 305 may determine when it is advantageous to copy data packets from first portion 314 of memory 308 allocated to device 306 to second portion 320 of memory 308 not allocated to device 306. As discussed, storing data packets within second portion 320 of memory 308 increases the overhead of processor unit 310. In situations where capacity 333 of first portion 314 of memory 308 is sufficient to store all data packets received, data packet management process 305 may determine that there is no need to store data packets in second portion 320 of memory 308.

In this example, data packet management process 305 may determine whether amount 334 of first portion 314 of memory 308 being used is greater than threshold capacity 336. For example, amount 334 is the amount of storage capacity of first portion 314 of memory 308 presently storing data packets, such as data packet 304. Data packet management process 305 may select threshold capacity 336. Threshold capacity 336 is a percentage of capacity 333 of first portion 314 of memory 308. Threshold capacity 336 may be selected based on capacity 333 of first portion 314 of memory 308. For example, threshold capacity 336 may be selected at a point where first portion 314 of memory 308 may run out of storage capacity.

In one illustrative example, once threshold capacity 336 has been reached, data packet management process 305 may begin to copy data packets smaller than threshold size 322 to second portion 320 of memory 308. In another example, threshold size 322 may be a first threshold size. Data packet management process 305 copies data packets smaller than the first threshold size to second portion 320 of memory 308. Thus, buffer 316 is not wasted on data packets smaller than the first threshold size. Next, as discussed above, data packet management process 305 may consider threshold capacity 336. If threshold capacity 336 has been reached, then data packet management process 305 may compare data packets received with a second threshold size larger than the first.

Data packet management process 305 may adjust threshold size 322 and threshold capacity 336. For example, data packet management process 305 may monitor network traffic 338 to determine the size and frequency of data packets transmitted.

Data packet management process 305 may also know capacity 333 of first portion 314 of memory 308 and maximum transmission unit 340 of device 306. Maximum transmission unit 340 is a physical property of device 306. Device 306 can only receive data packets as large as maximum transmission unit 340. A data packet larger than maximum transmission unit 340 will either be reduced in size or requested to be retransmitted so that device 306 can receive the data packet.

In these illustrative examples, data packet management process 305 may select threshold size 322 and threshold capacity 336 based on network traffic 338, capacity 333 of first portion 314 of memory 308, and maximum transmission unit 340 of device 306. For example, if an average size of data packets received at device increases, data packet management process 305 may select threshold size 322 to be above an average size of the data packets received. However, threshold size 322 would be selected to be less than maximum transmission unit 340. Maximum transmission unit 340 represents the largest data packets that can be received at device 306 based on the physical characteristics of device 306. Data packet management process 305 selects threshold size 322 to be smaller than maximum transmission unit 340 because maximum transmission unit 340 is the largest size of a data packet received at device 306.

In another example, if the frequency of data packets received at device 306 increases data packet management process 305 may increase threshold size 322 while decreasing threshold capacity 336. An increase in frequency of data packets received increases the likeliness that capacity 333 of first portion 320 of memory 308 may be exceeded. Selecting a larger value for threshold size 322 decreases the number of data packets that would be larger than threshold size 322. A lower number of data packets that are larger than threshold size 322 results in a lower number of data packets stored in first portion 314 of memory 308. Thus, data packet management process 305 is more selective with data packets stored in first portion 314 of memory 308.

On the other hand, selecting a smaller value for threshold capacity 336 means that data packet management process 305 determines whether data packets are larger than threshold size 322 sooner. A sooner determination whether data packets are larger than threshold size 322 results in a smaller percentage of first portion 314 of memory 308 storing data packets smaller than threshold size 322. In one illustrative embodiment, threshold capacity 336 is zero. Thus, none of the data packets stored in first portion 314 of memory 308 are smaller than threshold capacity 336.

In yet another example, threshold size 322 may be selected based on how quickly data packets are processed. As data packets are processed more slowly, less buffers are available to receive new data packets. With a lower number of number of buffers being available, data packet management process 305 may increase threshold size 322. Increasing threshold size 322 will preserve buffers in first portion 314 of memory 308 for larger data packets. On the other hand, as data packets are processed more quickly, buffers within first portion 314 of memory 308 are available sooner. Data packet management process 305 may decrease threshold size 322. A decrease in threshold size 322 decreases the number of data packets that are copied to second portion 320 of memory 308. Thus, the buffers within first portion 314 of memory 308 are used rather than second portion 320 of memory 308.

In still another example, threshold size 322 and threshold capacity 336 may vary by time. For example, data packet management process 305 may obtain historical data about network traffic 338. Data packet management process 305 may determine that certain times of day, days of the week, or any other times of the year may experience more or less frequency of network traffic 338. As a result, data packet management process 305 may adjust threshold size 322 and threshold capacity 336 to match network traffic 338.

By storing data packets smaller than threshold size 322 in second portion 320 of memory 308, data packet management process 305 improves the performance of device 306. For example, in general, processor unit 310 can access data packets smaller than threshold size 322 faster than data packets larger than threshold size 322. Storing data packets smaller than threshold size 322 in second portion 320 of memory 308 saves space in first portion 314 of memory 308 for data packets larger than threshold size 322. Thus in situations where data packets are received faster than they can be processed, buffers within first portion 314 of memory 308 are preserved for larger data packets.

Preservation of buffers within first portion 314 of memory 308 decreases the chance that data packets will be dropped. Additionally, the preference for larger data packets decreases an amount of overhead on processor unit 310. The buffers within first portion 314 of memory 308 are used more efficiently than without preferences for larger data packets. Thus, the management of data packets received in computer system 302 may decrease data packet retransmissions and increase the speed of connections within network 303.

The illustration of computer system 302 in data packet management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments, first portion 314 may be physically separate from second portion 320. For example, network adapter 312 may have memory that is physically part of network adapter 312. Second portion 320 may be a random access memory for computer system 302. Processor unit 310 may be a central processing unit for computer system 302 that controls access to the random access memory. In other illustrative embodiments, device 306 may be a disk drive controller, a graphics card, a network card, a network interface controller, a local area network adapter, or a sound card.

Still in other illustrative embodiments, multiple threshold capacities of first portion 314 and multiple threshold sizes for data packet 304 may be used. As an amount of available storage capacity in first portion 314 of memory 308 approaches capacity 333, data packet management process 305 may become increasingly selective. For example, once a first threshold capacity in first portion 314 is reached, a first threshold size may be established. After a larger threshold capacity is reached, a larger threshold size may be established. Data packet management process 305 may use any number of threshold sizes and threshold capacities. In yet another example, threshold size 322 may be a function of amount 334 of storage capacity available in first portion 314 of memory 308.

Figure 4:
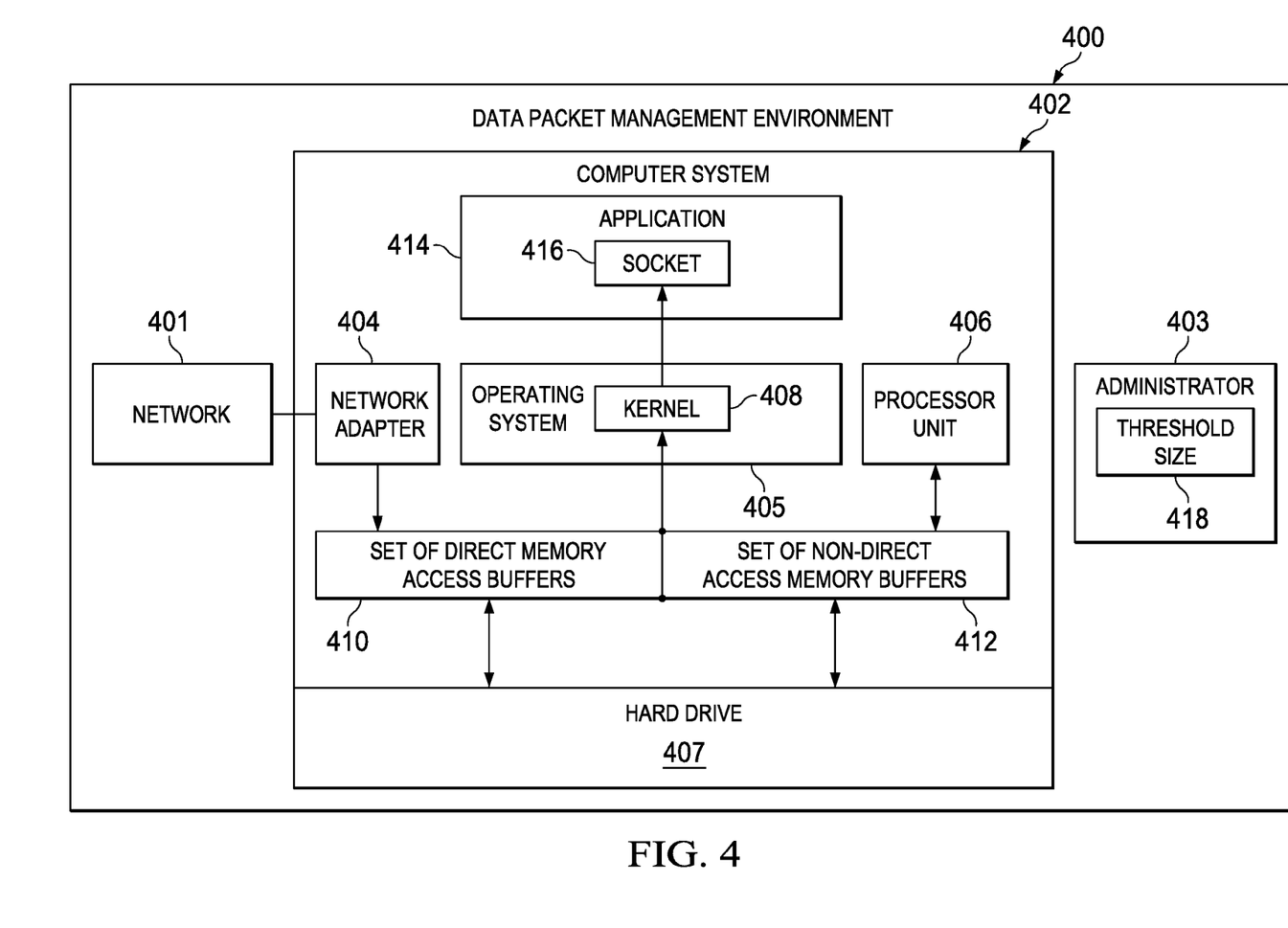
FIG. 4 is an illustration of a block diagram of a data packet management environment depicted in accordance with an illustrative embodiment.

With reference now to FIG. 4, a block diagram of a data packet management environment is depicted in accordance with an illustrative embodiment. As depicted data packet management environment 400 includes network 401, computer system 402, and administrator 403. Data packet management environment 400 is an example of one implementation of data packet management environment 300 in FIG. 3. As depicted, computer system 402 includes network adapter 404, operating system 405, processor unit 406, and hard drive 407.

In this illustrative example, functions of data packet management process 305 in FIG. 3 may be implemented in operating system 405 and carried out by kernel 408. For example, kernel 408 may implement a networking stack. A networking stack is an implementation of a network protocols. Network protocols include a description of data packet formats and rules for exchanging data packets in a network, such as network 401. Examples of network protocols may include internet protocol (IP) and transmission control protocol (TCP). Kernel 408 directs data packets received at computer system 402 according to the network protocols.

For example, kernel 408 may direct data packets received at network adapter 404 to at least one of set of direct memory access buffers 410 and set of non-direct memory access buffers 412. In another example, kernel 408 may track data packets stored in at one of set of direct memory access buffers 410 and set of non-direct memory access buffers 412. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

When application 414 requests a data packet, application 414 opens socket 416. Socket 416 is an endpoint for communication in a network. Socket 416 may also be an interface to another program that is implemented by application 414, such as for example an application programming interface (API). Kernel 408 detects when socket 416 is opened. Kernel 408 then maps the data packet stored in one of set of direct memory access buffers 410 and set of non-direct memory access buffers 412 to application 414. Kernel 408 can then direct data packets to application 414 using socket 416. For example, application 414 may access data in the data packets using socket 416.

In these illustrative examples, kernel 408 may also track references, such as reference 330 in FIG. 3, to data packets held by an application such as application 414. Kernel 408 can also maintain a count, such as count 332 in FIG. 3, of data packets stored in set of non-direct memory access buffers 412.

Administrator 403 in data packet management environment 400 may implement functions of data packet management process 305 in FIG. 3. For example, administrator 403 may establish thresholds for computer system 402. Administrator 403 may establish threshold size 418 for whether data packets are stored in set of direct memory access buffers 410 or copied to set of non-direct memory access buffers 412. Administrator 403 may also establish a threshold capacity, such as threshold capacity 336 in FIG. 3, for set of direct memory access buffers 410.

In these illustrative examples, administrator 403 is an entity that establishes values and controls for computer system 402. For example, administrator 403 may be a server computer that provides updates to computer system 402. In another example, administrator 403 may be a program on computer system 402 that adjusts threshold size 418 based on conditions within computer system 402. In yet another example, administrator 403 may be a person that establishes threshold size 418 based on data obtained about data packet management environment 400.

Figure 5:
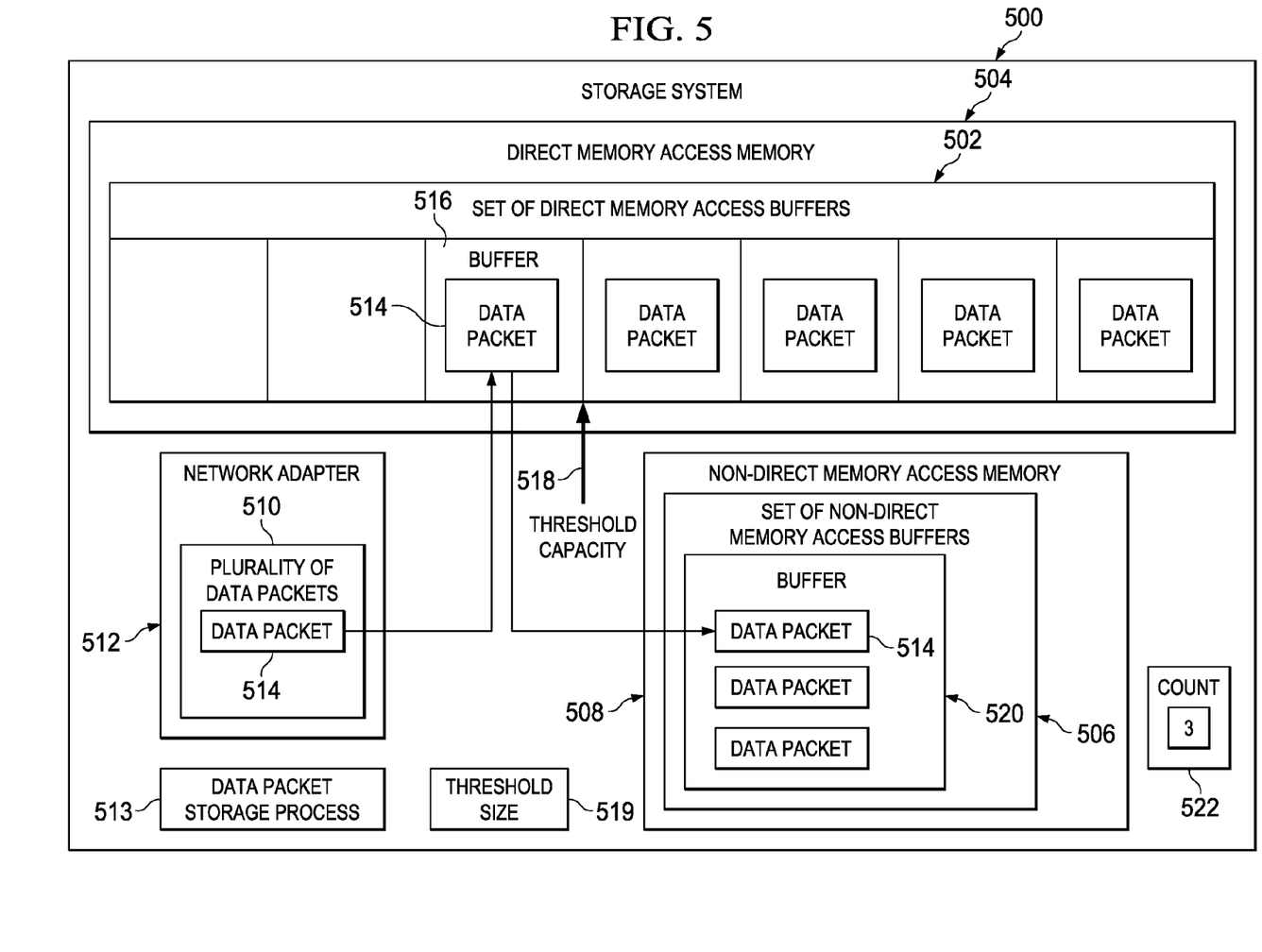
FIG. 5 is an illustration of a block diagram of a storage system depicted in accordance with an illustrative embodiment.

With reference now to FIG. 5, a block diagram of a storage system is depicted in accordance with an illustrative embodiment. In these examples, storage system 500 may be an example of one implementation of memory 308 in FIG. 3. As depicted storage system 500 includes set of direct memory access buffers 502 in direct memory access memory 504 and set of non-direct memory access buffers 506 in non-direct memory access memory 508. Storage system 500 receives plurality of data packets 510 on network adapter 512. Data packet storage process 513 controls the storage of plurality of data packets 510 in storage system 500.

In this illustrative example, when network adapter 512 receives data packet 514 in plurality of data packets 510, network adapter 512 stores data packet 514 in buffer 516 in set of direct memory access buffers 502. Data packet storage process 513 determines whether threshold capacity 518 of direct memory access memory 504 has been exceeded. As depicted, threshold capacity 518 has been exceeded. Then, data packet storage process 513 determines whether data packet 514 is smaller than threshold size 519. As depicted, data packet 514 is smaller than threshold size 519.

In some illustrative examples, data packet storage process 513 may not consider threshold capacity 518. Data packet storage process 513 may copy all data packets smaller than threshold size 519 into non-direct memory access memory 508. Thus, buffers within set of direct memory access buffers 502 are not wasted on data packets smaller than threshold size 519.

At this point, network adapter requests that data packet 514 be copied to non-direct memory access memory 508. The buffer 520 is created in non-direct memory access memory 508. Buffer 520 is in non-direct memory access memory 508. With this type of memory, data packet 514 is copied to buffer 520 using a processor unit. This processor unit may be processor unit 406 in FIG. 4. Data packet storage process 513 tracks the storage of data packet 514 in buffer 520. Data packet storage process 513 increases count 522 for each data packet stored in buffer 520 in non-direct memory access memory 508.

The illustrations of data packet management environment 400 in FIG. 4 and storage system 500 in FIG. 5 are not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments, data packet management environment 400 may not include administrator 403 in FIG. 4. Threshold size 418 may be a function of conditions within computer networking environment 400 in FIG. 4. In other examples, functions of data packet storage process 513 may be implemented in a kernel of an operating system, such as kernel 408 and operating system 405 in FIG. 4.

With reference now to FIG. 6, a flowchart of a process for managing data packets is depicted in accordance with an illustrative embodiment. The process may be performed by data packet management process 305 running on computer system 302 in FIG. 3.

The process begins by receiving a data packet at a device (step 602). In step 602, the data packet may be received by a network adapter, such as network adapter 312 in FIG. 3.

The process then stores the data packet in a first portion of a memory allocated to the device (step 604). In step 604, the data packet may be stored in a direct memory access buffer in a set of direct memory access buffers, such as set of direct memory access buffers 410 in FIG. 4. Thereafter, the process determines whether a size of the data packet is less than a threshold size (step 606).

The process then copies the data packet from the first portion of the memory allocated to the device to a second portion of the memory (step 608), with the process terminating thereafter. In step 608, the data packet may be copied to a non-direct memory access buffer in a set of non-direct memory access buffers, such as set of non-direct memory access buffers 412 in FIG. 4. The data packet stored in the first portion of the memory may be overwritten and/or deleted.

Figure 7:
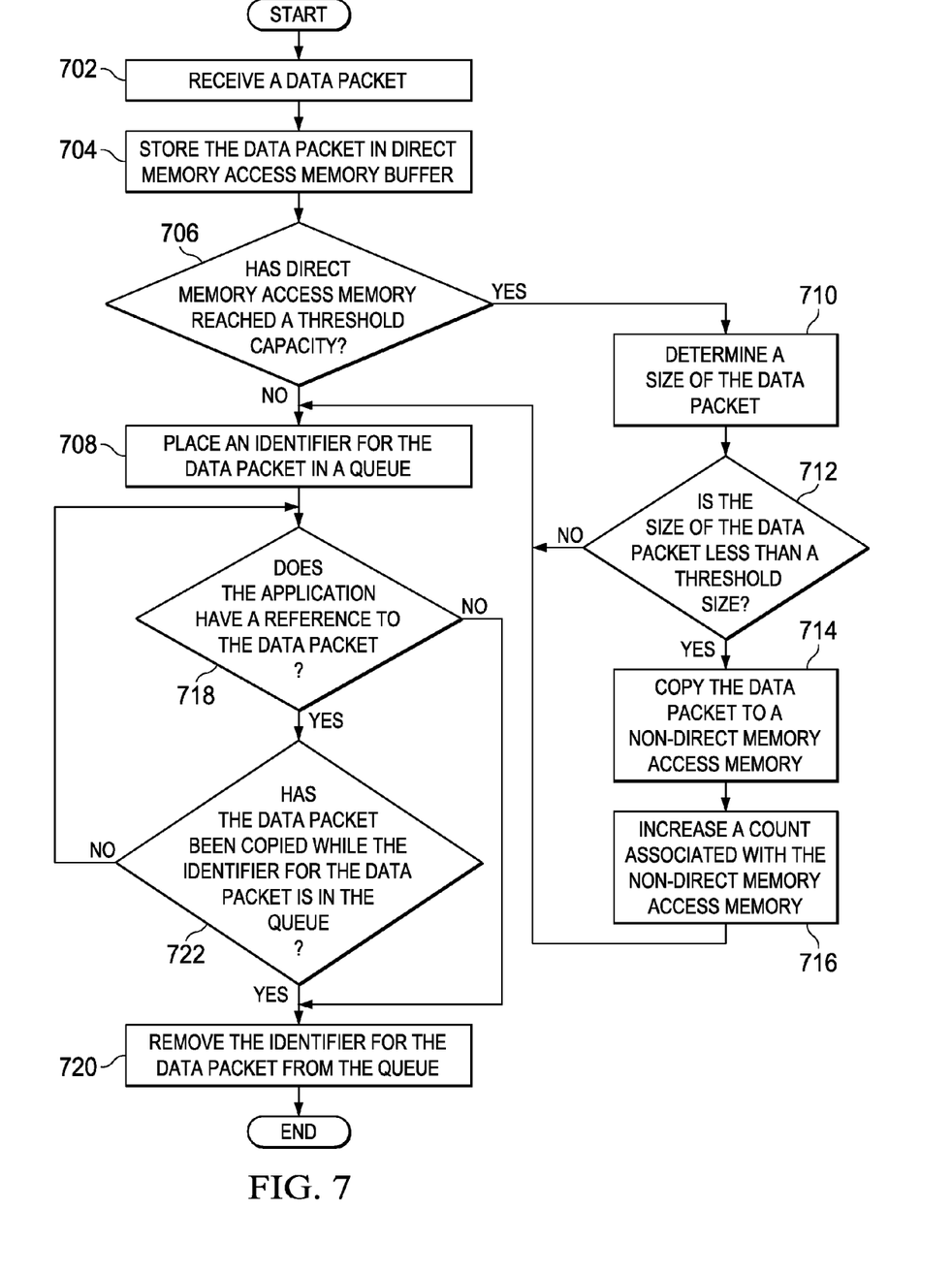
FIG. 7 is a flowchart of a process for storing data packets in a memory depicted in accordance with an illustrative embodiment.

With reference now to FIG. 7, a flowchart of a process for storing data packets in a memory is depicted in accordance with an illustrative embodiment. The process may be performed by data packet management process 305 running on computer system 302 in FIG. 3.

The process begins by receiving a data packet (step 702). The process then stores the data packet in a direct memory access buffer (step 704).

Thereafter, the process determines whether direct memory access memory has reached a threshold capacity (step 706). If the process determines that direct memory access memory has not reached the threshold capacity, the process places an identifier for the data packet in a queue (step 708). If the process determines that direct memory access memory has reached the threshold capacity, the process determines a size of the data packet (step 710).

The process then determines whether the size of the data packet is less than a threshold size (step 712). If the process determines that the size of the data packet is greater than the threshold size, the process places an identifier for the data packet in a queue (step 708). If the process determines that the size of the data packet is less than a threshold size, the process copies the data packet to a non-direct memory access memory (step 714). The process then increases a count associated with the non-direct memory access memory (step 716).

Thereafter, the process places an identifier for the data packet in a queue (step 708). The process then determines whether an application has a reference to the data packet (step 718). If the process determines that an application does not have the reference to the data packet, the process removes the identifier for the data packet from the queue (step 720), with the process terminating thereafter. In step 720, the storage space occupied by the data packet may be made available for new data packets received.

If the process determines that an application does have the reference to the data packet, the process determines whether the data packet has been copied while the identifier for the data packet is in the queue (step 722). If the process determines that the data packet has not been copied while the identifier for the data packet is in the queue, the process returns to step 718. If the process determines that the data packet has been copied while the identifier for the data packet is in the queue, the process removes the identifier for the data packet from the queue (step 720), with the process terminating thereafter.

The flowchart and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, step 706 may be removed. The process may copy all data packets having a size that is less than the threshold size to the non-direct memory access memory in step 714.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the different illustrative embodiments allow for data packets to be received while managing where the data packets are stored based on the amount of direct memory access memory available. By storing data packets smaller than a threshold size in non-direct memory access memory, direct access memory buffers are not wasted. In situations where data packets are received faster than they can be processed, direct access memory buffers are preserved for data packets larger than the threshold size. The preservation of direct access memory decreases the chance that data packets will be dropped.

Additionally, in the different illustrative embodiments, the preference for larger data packets decreases an amount of overhead on a processor unit, because smaller data packets require less processing by the processor unit to store in the non-direct memory access memory. The direct access memory buffers are used more efficiently than without preferences for larger data packets in the illustrative embodiments. The management of data packets received by the network adapter may also decrease data packet retransmissions and increase the speed of connections within the network in the illustrative embodiments.

Thus, the different illustrative embodiments provide a method, computer program product, and apparatus for managing data packets. In an illustrative embodiment, a data packet in the data packets is stored in a first portion of a memory in response to receiving the data packet at a device. The first portion of the memory is allocated to the device. A determination is made as to whether a size of the data packet is less than a threshold size. The data packet is copied from the first portion of the memory allocated to the device to a second portion of the memory in response to a determination that the size of the data packet stored in the memory is less than the threshold size.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing data packets, the method comprising:
responsive to receiving a data packet in the data packets at a device, storing the data packet in a first portion of a memory, wherein the first portion of the memory is allocated to the device;
determining whether a size of the data packet is less than a threshold size, wherein the threshold size is selectable and configurable and wherein a decrease in the threshold size decreases a number of the data packets to be copied to a second portion of the memory;
responsive to a determination that the size of the data packet stored in the memory is less than the threshold size, copying the data packet from the first portion of the memory allocated to the device to the second portion of the memory; and
placing an identifier for the data packet in a queue for processing of the data packet while the data packet is stored in one of the first portion of the memory and the second portion of the memory.

2. The method of claim 1 wherein the identifier further comprises metadata identifying the data packet including information found in a header of the data packet, the information comprising an internet protocol address of associated with a sender, an internet protocol address of associated with a recipient, a size of the data packet, a content of the data packet, a time the packet was requested, a time the packet was sent, and a time the data packet was received.

3. The method of claim 2 further comprising:
responsive to copying the data packet to the second portion of the memory, increasing a count associated with the second portion of the memory; and
responsive to the identifier for the data packet being removed from the queue, decreasing the count associated with the second portion of the memory.

4. The method of claim 3 further comprising:
determining whether an application has a reference to the data packet;
determining whether the data packet has been copied while the identifier for the data packet is in the queue;
responsive to a determination that the application does not have the reference to the data packet, removing the identifier for the data packet from the queue; and
responsive to a determination that the data packet has been copied while the identifier for the data packet is in the queue, removing the identifier for the data packet from the queue.

5. The method of claim 1 further comprising:
determining whether an amount of the first portion of the memory being used is greater than a threshold capacity, wherein determining whether the size of the data packet is less than the threshold size further comprises:
responsive to a determination that the amount of the first portion of the memory being used is greater than the threshold capacity, determining whether the size of the data packet is less than the threshold size.

6. The method of claim 1 further comprising:
analyzing data regarding an amount of network traffic associated with the device, a maximum transmission unit associated with the device, and a capacity of the first portion of the memory allocated to the device; and
determining the threshold size based on the amount of network traffic associated with the device, maximum transmission unit associated with the device, and the capacity of the first portion of the memory allocated to the device.

7. The method of claim 1 further comprising:
allocating the first portion of the memory to the device, wherein the device is configured to read data from the first portion of the memory and write data to the first portion of the memory independently of a processor unit associated with the memory and wherein the processor unit is configured to read data from the second portion of the memory and write data to the second portion of the memory.

8. The method of claim 7, wherein the first portion of the memory allocated to the device is a set of direct memory access buffers and wherein the device is a network adapter.

9. A computer program product for managing data packets, the computer program product comprising:
a non-transitory computer readable storage medium:
program code, stored on the non-transitory computer readable storage medium, for storing a data packet in a first portion of a memory in response to receiving the data packet at a device, wherein the first portion of the memory is allocated to the device;
program code, stored on the non-transitory computer readable storage medium, for determining whether a size of the data packet is less than a threshold size, wherein the threshold size is selectable and configurable and wherein a decrease in the threshold size decreases a number of the data packets to be copied to a second portion of the memory;
program code, stored on the non-transitory computer readable storage medium, for copying the data packet from the first portion of the memory allocated to the device to the second portion of the memory in response to a determination that the size of the data packet stored in the memory is less than the threshold size; and
program code, stored on the non-transitory computer readable storage medium, for placing an identifier for the data packet in a queue for processing of the data packet while the data packet is stored in one of the first portion of the memory and the second portion of the memory.

10. The computer program product of claim 9 wherein the identifier further comprises metadata identifying the data packet including information found in a header of the data packet, the information comprising an internet protocol address of associated with a sender, an internet protocol address of associated with a recipient, a size of the data packet, a content of the data packet, a time the packet was requested, a time the packet was sent, and a time the data packet was received.

11. The computer program product of claim 10 further comprising:
program code, stored on the non-transitory computer readable storage medium, for increasing a count associated with the second portion of the memory in response to copying the data packet to the second portion of the memory; and
program code, stored on the computer readable storage medium, for decreasing the count associated with the second portion of the memory in response to the identifier for the data packet being removed from the queue.

12. The computer program product of claim 11 further comprising:
program code, stored on the non-transitory computer readable storage medium, for determining whether an application has a reference to the data packet;
program code, stored on the non-transitory computer readable storage medium, for determining whether the data packet has been copied while the identifier for the data packet is in the queue;
program code, stored on the non-transitory computer readable storage medium, for removing the identifier for the data packet from the queue in response to a determination that the application does not have the reference to the data packet; and program code, stored on the non-transitory computer readable storage medium, for removing the identifier for the data packet from the queue in response to a determination that the data packet has been copied while the identifier for the data packet is in the queue.

13. The computer program product of claim 9 further comprising:
program code, stored on the non-transitory computer readable storage medium, for determining whether an amount of the first portion of the memory being used is greater than a threshold capacity;
wherein the program code for determining whether the size of the data packet is less than the threshold size further comprises:
program code, stored on the non-transitory computer readable storage medium, for determining whether the size of the data packet is less than the threshold size in response to a determination that the amount of the first portion of the memory being used is greater than the threshold capacity.

14. The computer program product of claim 9 further comprising:
program code, stored on the non-transitory computer readable storage medium, for analyzing data regarding an amount of network traffic associated with the device and a capacity of the first portion of the memory allocated to the device; and
program code, stored on the non-transitory computer readable storage medium, for determining the threshold size based on the amount of network traffic associated with the device and the capacity of the first portion of the memory allocated to the device.

15. The computer program product of claim 9 further comprising:
program code, stored on the non-transitory computer readable storage medium, for allocating the first portion of the memory to the device, wherein the device is configured to read data from the first portion of the memory and write data to the first portion of the memory independently of a processor unit associated with the memory and wherein the processor unit is configured to read data from the second portion of the memory and write data to the second portion of the memory.

16. An apparatus comprising:
a bus system;
a storage device connected to the bus system, wherein the storage device includes program code; and
a processor unit connected to the bus system, wherein the processor unit is configured to execute the program code to store a data packet in a first portion of a memory in response to receiving the data packet at a device, wherein the first portion of the memory is allocated to the device; determine whether a size of the data packet is less than a threshold size, wherein the threshold size is selectable and configurable and wherein a decrease in the threshold size decreases a number of the data packets to be copied to a second portion of the memory; copy the data packet from the first portion of the memory allocated to the device to the second portion of the memory in response to a determination that the size of the data packet stored in the memory is less than the threshold size; and place an identifier for the data packet in a queue for processing of the data packet while the data packet is stored in one of the first portion of the memory and the second portion of the memory.

17. The apparatus of claim 16, wherein the identifier further comprises metadata identifying the data packet including information found in a header of the data packet, the information comprising an internet protocol address of associated with a sender, an internet protocol address of associated with a recipient, a size of the data packet, a content of the data packet, a time the packet was requested, a time the packet was sent, and a time the data packet was received.

18. The apparatus of claim 17, wherein the processor unit is further configured to execute the program code to increase a count associated with the second portion of the memory in response to copying the data packet to the second portion of the memory; and decrease the count associated with the second portion of the memory in response to the identifier for the data packet being removed from the queue.

19. The apparatus of claim 18, wherein the processor unit is further configured to execute the program code to determine whether an application has a reference to the data packet; determine whether the data packet has been copied while the identifier for the data packet is in the queue; remove the identifier for the data packet from the queue in response to a determination that the application does not have the reference to the data packet; and remove the identifier for the data packet from the queue in response to a determination that the data packet has been copied while the identifier for the data packet is in the queue.

20. The apparatus of claim 16, wherein the processor unit is further configured to execute the program code to determine whether an amount of the first portion of the memory being used is greater than a threshold capacity; wherein in executing the program code to determine whether the size of the data packet is less than the threshold size the processor unit is further configured to execute the program code to determine whether the size of the data packet is less than the threshold size in response to a determination that the amount of the first portion of the memory being used is greater than the threshold capacity.

* * * * *